United States Patent
Tugnawat et al.

(10) Patent No.: US 12,160,761 B2
(45) Date of Patent: Dec. 3, 2024

(54) CONFORMANCE TESTING OF SEGMENTATION

(71) Applicant: QUALCOMM Incorporated, San Diego, CA (US)

(72) Inventors: Yogesh Tugnawat, San Diego, CA (US); Taran Dhuppad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/647,136

(22) Filed: Jan. 5, 2022

(65) Prior Publication Data

US 2022/0256376 A1    Aug. 11, 2022

Related U.S. Application Data

(60) Provisional application No. 63/260,222, filed on Aug. 12, 2021, provisional application No. 63/199,992, filed on Feb. 8, 2021.

(51) Int. Cl.
*H04W 24/08* (2009.01)

(52) U.S. Cl.
CPC .................................. *H04W 24/08* (2013.01)

(58) Field of Classification Search
CPC ....... H04W 24/08; H04W 24/06; H04W 4/12; H04W 76/20; H04W 76/27; H04W 76/28; H04W 92/18; H04W 48/14; H04W 8/22; H04W 8/24; H04W 72/20; H04W 72/21; H04W 72/50; H04W 72/04; H04W 80/02; H04W 80/08; H04L 1/00; H04L 1/08; H04L 1/18; H04L 5/00; H04L 29/06; H04L 69/16; H04L 69/22
USPC .......................................................... 370/252
See application file for complete search history.

(56) References Cited

U.S. PATENT DOCUMENTS

| | | | |
|---|---|---|---|
| 10,080,098 B1* | 9/2018 | Edge ...................... H04L 63/08 |
| 11,076,330 B2* | 7/2021 | Venkataraman ............................ H04W 36/00222 |
| 11,102,678 B2* | 8/2021 | Liu ..................... H04W 28/065 |
| 11,218,870 B2* | 1/2022 | Jin ......................... H04W 76/30 |
| 11,240,706 B2* | 2/2022 | Edge ...................... H04W 4/20 |
| 11,330,661 B2* | 5/2022 | Kim ....................... H04L 47/43 |
| 11,671,871 B2* | 6/2023 | Liu ..................... H04W 28/065 370/310 |
| 11,812,508 B2* | 11/2023 | Jin ......................... H04W 76/34 |
| 2021/0219128 A1* | 7/2021 | Wu ..................... H04W 28/065 |
| 2022/0217583 A1* | 7/2022 | Jin .......................... H04W 8/24 |
| 2022/0264693 A1* | 8/2022 | Kim ..................... H04W 28/065 |
| 2022/0287130 A1* | 9/2022 | He ........................ H04W 76/19 |

(Continued)

FOREIGN PATENT DOCUMENTS

CA      2644528 A1    9/2007

*Primary Examiner* — Man U Phan
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a request message indicating that the UE is to set particular content for UE capability information. The UE may receive, from the base station, a UE capability enquiry message. The UE may transmit, to the base station, one or more segments of a UE capability information message having the particular content. Numerous other aspects are described.

30 Claims, 10 Drawing Sheets

(56) References Cited

U.S. PATENT DOCUMENTS

2023/0025829 A1\* 1/2023 Jin .................. H04L 69/325

\* cited by examiner

CONFORMANCE TESTING OF SEGMENTATION

CROSS-REFERENCE TO RELATED APPLICATION

This patent application claims priority to U.S. Provisional Patent Application No. 63/199,992, filed on Feb. 8, 2021, entitled "CONFORMANCE TESTING OF UPLINK SEGMENTATION," and to U.S. Provisional Patent Application No. 63/260,222, filed on Aug. 12, 2021, entitled "CONFORMANCE TESTING OF SEGMENTATION," which are assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for conformance testing of segmentation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to: receive, from a base station, a request message indicating that the UE is to set particular content for UE capability information; receive, from the base station, a UE capability enquiry message; and transmit, to the base station, one or more segments of a UE capability information message having the particular content.

In some aspects, a base station for wireless communication includes a memory and one or more processors coupled to the memory, the memory and the one or more processors configured to: transmit, to a UE, a request message indicating that the UE is to set particular content for UE capability information; transmit, to the UE, a UE capability enquiry message; and receive, from the UE, one or more segments of a UE capability information message having the particular content.

In some aspects, a method of wireless communication performed by a UE includes receiving, from a base station, a request message indicating that the UE is to set particular content for UE capability information; receiving, from the base station, a UE capability enquiry message; and transmitting, to the base station, one or more segments of a UE capability information message having the particular content.

In some aspects, a method of wireless communication performed by a base station includes transmitting, to a UE, a request message indicating that the UE is to set particular content for UE capability information; transmitting, to the UE, a UE capability enquiry message; and receiving, from the UE, one or more segments of a UE capability information message having the particular content.

In some aspects, an apparatus for wireless communication includes means for receiving, from a base station, a request message indicating that the apparatus is to set particular content for UE capability information; means for receiving, from the base station, a UE capability enquiry message; and means for transmitting, to the base station, one or more segments of a UE capability information message having the particular content.

In some aspects, an apparatus for wireless communication includes means for transmitting, to a UE, a request message indicating that the UE is to set particular content for UE capability information; means for transmitting, to the UE, a UE capability enquiry message; and means for receiving, from the UE, one or more segments of a UE capability information message having the particular content.

In some aspects, a non-transitory computer-readable medium storing a set of instructions for wireless communication includes one or more instructions that, when executed by one or more processors of a UE, cause the UE to: receive, from a base station, a request message indicating that the UE is to set particular content for UE capability information; receive, from the base station, a UE capability enquiry message; and transmit, to the base station, one or more segments of a UE capability information message having the particular content.

In some aspects, a non-transitory computer-readable medium storing a set of instructions for wireless communication includes one or more instructions that, when executed by one or more processors of a base station, cause the base station to: transmit, to a UE, a request message indicating that the UE is to set particular content for UE capability information; transmit, to the UE, a UE capability enquiry message; and receive, from the UE, one or more segments of a UE capability information message having the particular content.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
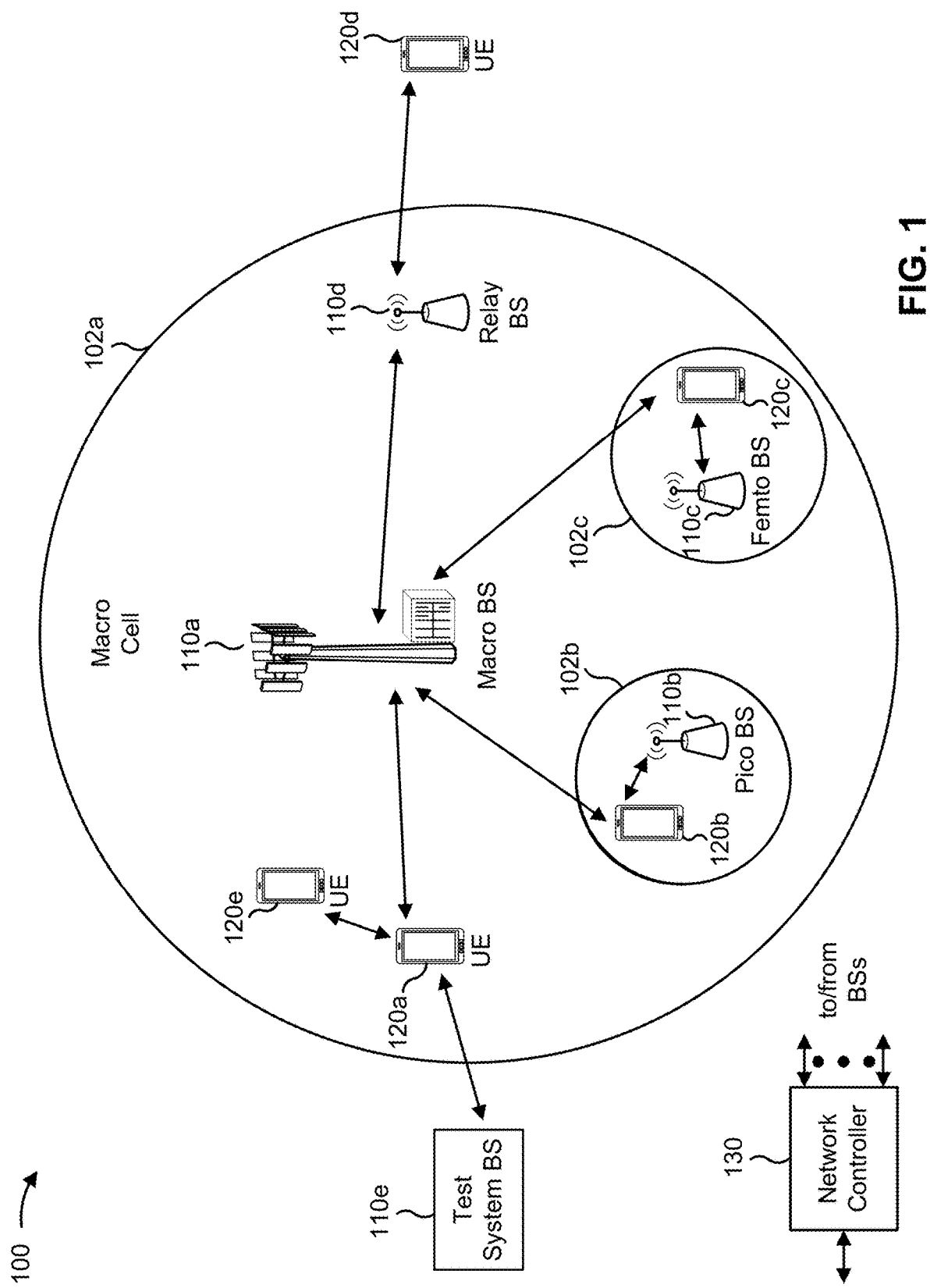
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A test system BS 110e may be connected to a UE 120 via a wireless connection and/or a wired connection. The test system BS 110e may be a test system (also referred to as a simulation system) that provides conformance testing for one or more communication standards (e.g., 3GPP technical specifications). The test system BS 110e may simulate the functions of a base station 110. In some examples, the test system BS 110e may be a component of a base station 110.

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
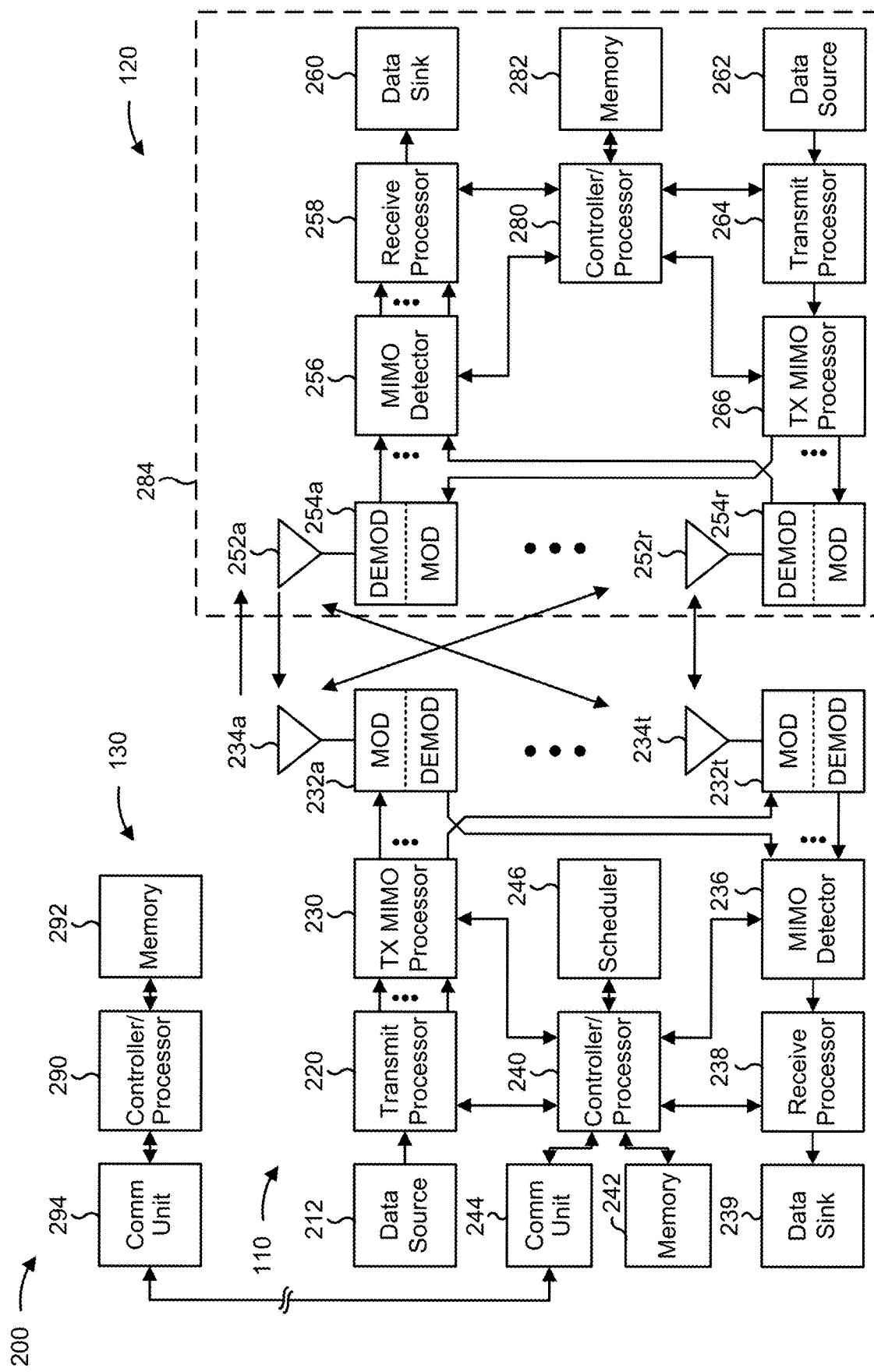
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream.

Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4A-4B and 5-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4A-4B and 5-6).

Controller/processor 240 of base station 110, controller/processor 280 of UE 120, and/or any other component(s) of FIG. 2 may perform one or more techniques associated with conformance testing of segmentation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving, from a base station, a request message indicating that the UE is to include particular content in a UE capability information message; means for receiving, from the base station, a UE capability enquiry message; and/or means for transmitting, to the base station, one or more segments of the UE capability information message having the particular content. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting a response message providing confirmation that the UE is to include the particular content in the UE capability information message. In some aspects, the UE includes means for entering a test mode based at least in part on receiving the request message. In some aspects, the UE includes means for obtaining the particular content from the request message or from a storage of the UE. In some aspects, the UE includes means for generating the UE capability information message with the particular content.

In some aspects, the base station includes means for transmitting, to a UE, a request message indicating that the UE is to include particular content in a UE capability information message; means for transmitting, to the UE, a UE capability enquiry message; and/or means for receiving, from the UE, one or more segments of the UE capability information message having the particular content. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving a response message providing confirmation that the UE is to include the particular content in the UE capability information message. In some aspects, the base station includes means for determining whether the one or more segments of the UE capability information message are in conformance with a standard.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
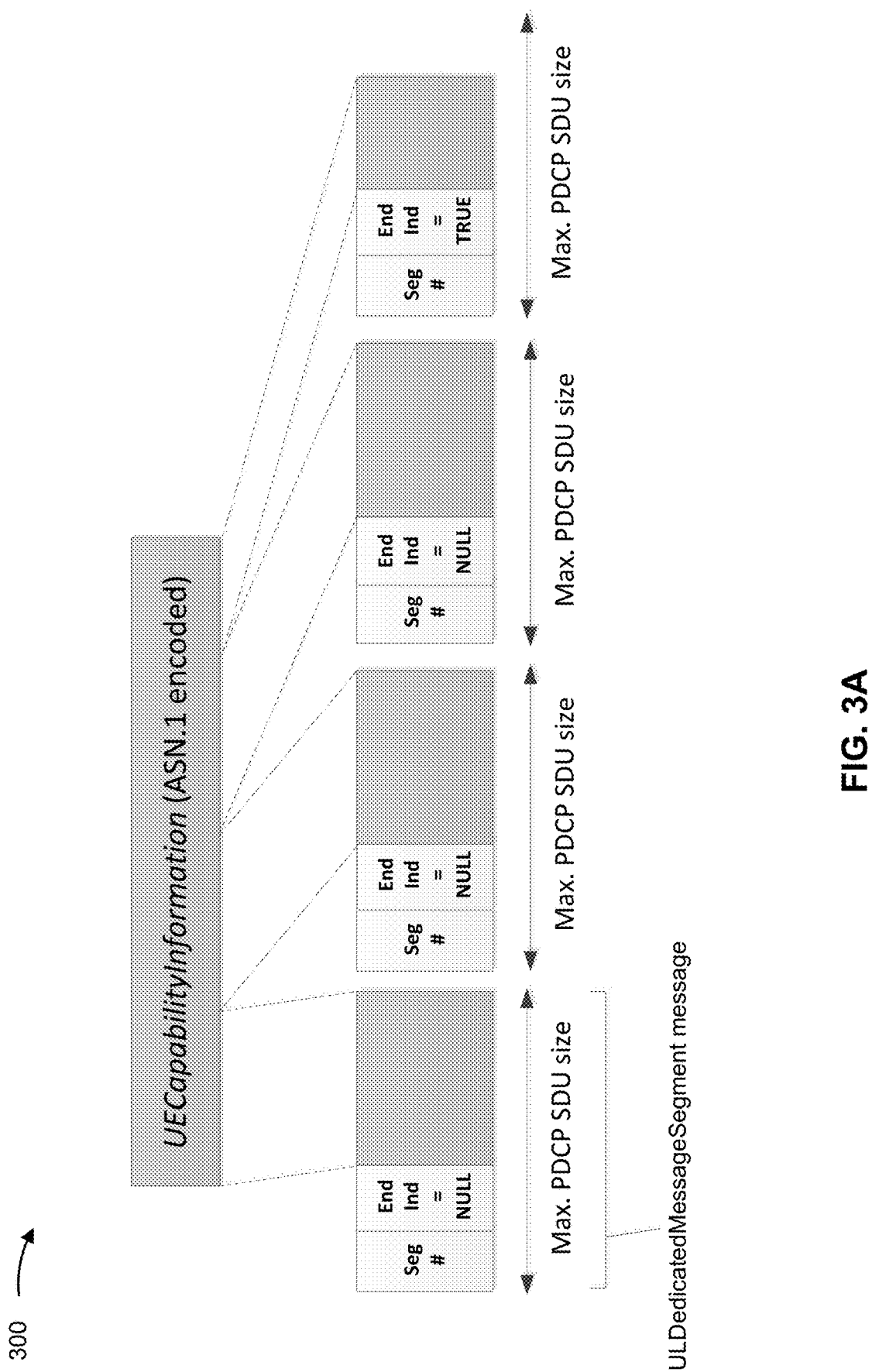
FIGS. 3A-3B are diagrams illustrating examples of message segmentation, in accordance with the present disclosure.

FIG. 3A is a diagram illustrating an example 300 of message segmentation, in accordance with the present disclosure. In some examples, an uplink or downlink message may have a size that exceeds a maximum packet size (e.g., a maximum packet data convergence protocol (PDCP) service data unit (SDU) size). In such cases, radio resource control (RRC)-level segmentation of the message may be performed so that the message can be transmitted in smaller-sized segments.

A UE capability information message (e.g., a UECapabilityInformation message) is an uplink message that indicates a set of capabilities of a UE. A UE capability information message may be associated with radio capability signaling (RACS). In some examples, a UE capability information message may have a size that exceeds an NR maximum PDCP SDU size of 9 kilobytes (kB). This may be due to the UE capability information message indicating all of the band combination capabilities of a UE. For example, the combined size of all evolved universal mobile telecommunications system (UMTS) terrestrial radio access (E-UTRA), NR standalone, and dual connectivity radio capabilities of the UE may be several tens of kilobytes. In some examples, a network may obtain UE capability information only after access stratum security activation.

Network support for segmentation may be indicated in a UE capability enquiry message (e.g., in a rrc-SegAllowed information element of a UECapabilityenquiry message) that is transmitted from a base station to a UE. Thus, if segmentation support is indicated, a UE may transmit a UE capability information message, that exceeds a maximum PDCP SDU size, in multiple segments. Otherwise, the UE may truncate the UE capability information message to the maximum PDCP SDU size.

A UE may perform RRC-level segmentation of a UE capability information message, that exceeds a maximum PDCP SDU size (e.g., 9 kB), as shown in FIG. 3A. As shown, the UE may encapsulate a segment of the message in a dedicated message-segment message (e.g., in a ULDedicatedMessageSegment message). The dedicated message-segment message may indicate (e.g., in a header of the message) a segment number associated with the segment and a segment end indication that indicates whether the segment is the last segment for the segmented message. The RRC-level segments may be provided to lower layers (e.g., a PDCP layer, a radio link control (RLC) layer, a medium access control (MAC) layer, and/or a physical (PHY) layer) for transmission in ascending order according to segment number.

As indicated above, FIG. 3A is provided as an example. Other examples may differ from what is described with respect to FIG. 3A.

Figure 3B:
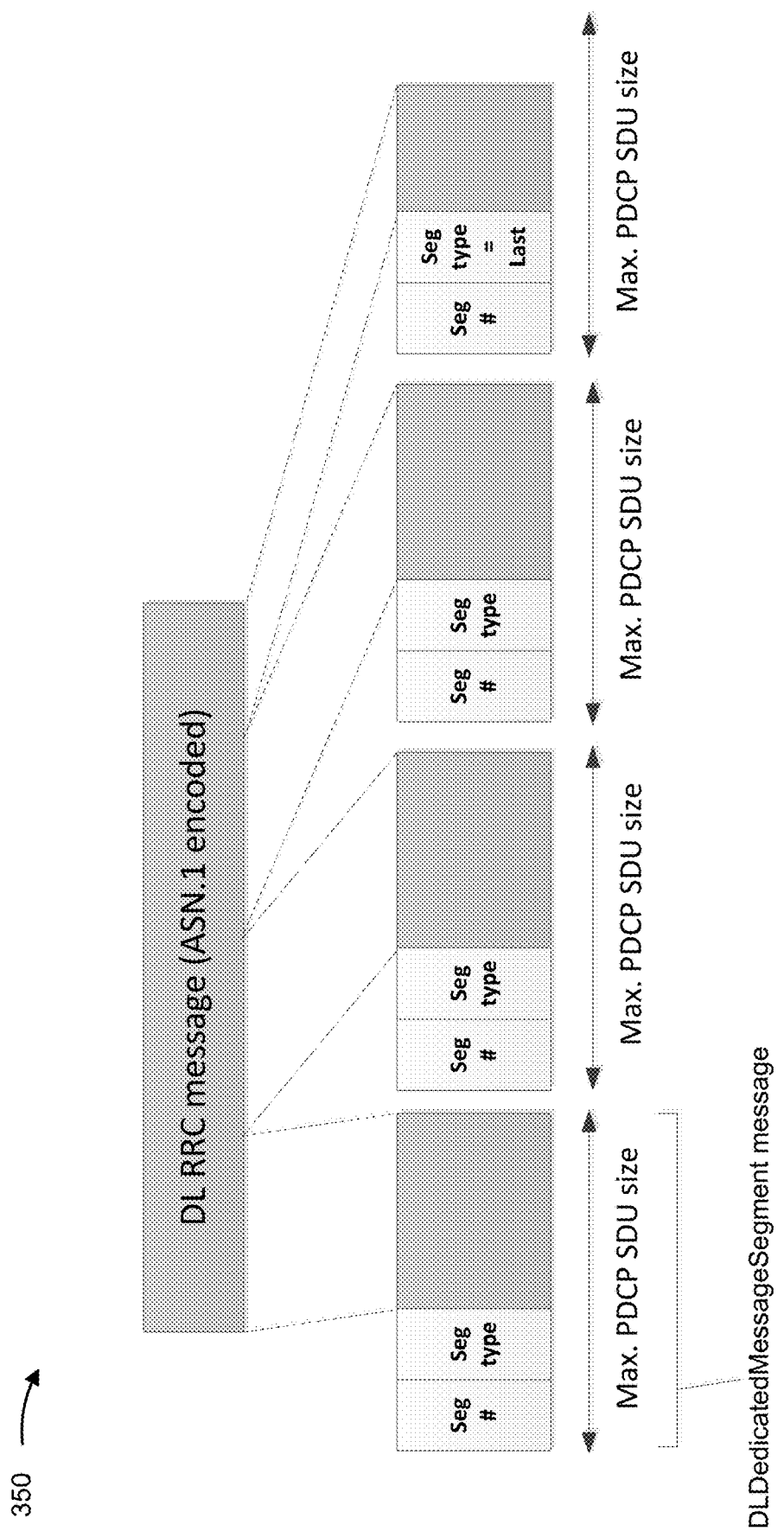

FIG. 3B is a diagram illustrating an example 350 of message segmentation, in accordance with the present disclosure. As shown in FIG. 3B, segmentation may be used for a downlink message, in a similar manner as described in connection with FIG. 3A. As described above, a maximum size of a downlink RRC message may be limited by a maximum PDCP SDU size (e.g., 9 kB in NR). However, the entire size of an RRC configuration for a UE may exceed the maximum size for a downlink RRC message (e.g., a UE may be required to use an RRC buffer size of 45 kB). Accordingly, numerous RRC messages (e.g., indicating "delta" configurations) may be needed to build the entire RRC configuration for a UE.

In some examples, a base station may perform RRC-level segmentation of downlink messages. Segmentation may be used for a message relating to resuming an RRC connection and/or for a message relating to an RRC reconfiguration. For example, segmentation may be used for an RRCConnectionResume message and/or an RRCConnectionReconfiguration message (e.g., in LTE). As another example, segmentation may be used for an RRCResume message and/or RRCReconfiguration message (e.g., in NR).

As shown, a base station may encapsulate a segment of the message in a dedicated message-segment message (e.g., in a DLDedicatedMessageSegment message). The dedicated message-segment message may indicate (e.g., in a header of the message) a segment number associated with the segment and a segment type indication that indicates whether the segment is the last segment for the segmented message. The base station may transmit the message segments in sequence (e.g., in ascending order according to segment number). Thus, in-sequence delivery of the segments to a UE is assumed, and a UE's behavior in a case of out-of-order reception is left to UE implementation.

As indicated above, FIG. 3B is provided as an example. Other examples may differ from what is described with respect to FIG. 3B.

A cellular conformance ecosystem, such as the Global Certification Forum (GCF) or PTCRB, may execute one or more test cases (e.g., the test cases identified in 3GPP Technical Specification 38.509) against a UE to verify that a protocol implementation in the UE meets the requirements defined by a telecommunication standard. A UE that meets the requirements may be certified for commercialization. A test case may include pseudo code that is implemented in Testing and Test Control Notation (TTCN).

In some cases, a feature of a telecommunication standard may be difficult to test. For example, as described above, if a UE and a network support RRC-level uplink segmentation, and if the size of the UE's capability information message exceeds a maximum packet size, then the UE may perform segmentation of the message. However, there is currently no capability indication for a UE to indicate that the size of UE capability information exceeds a maximum PDCP SDU size (e.g., to indicate that the capability information is being transmitted in segments). Moreover, the size of UE capability information may be variable based on various parameters, such as the bands supported by a UE, carrier aggregation combinations supported by the UE, and/or other features supported by the UE, as well as various operator requirements. Thus, if a UE capability information message is smaller than the threshold size for segmentation, a UE does not perform segmentation. Accordingly, it is difficult to ascertain whether a UE is transmitting conforming message segments because there is no reliable segmentation outcome that is suitable for a test case.

As a result, a UE may transmit non-conforming segments of UE capability information to a base station. Accordingly, the base station may configure the UE improperly or in a suboptimal manner. Moreover, the UE and the base station may expend computing resources processing non-conforming segments of UE capability information. In addition, if the UE's capability information is not properly transmitted, the base station may repeatedly request, and/or the UE may repeatedly transmit, UE capability information, which consumes significant network resources.

Similarly, as described above, if a UE supports RRC-level downlink segmentation, and if the size of a network's downlink RRC message (e.g., an RRC resume message and/or an RRC reconfiguration message) exceeds a maximum packet size (e.g., 9 kB), then downlink segmentation is used. However, the size of the downlink RRC message may be variable based on various parameters, such as the bands supported by a UE, carrier aggregation combinations supported by the UE, and/or other features supported by the UE. Thus, if a downlink RRC message is smaller than the threshold size for segmentation, segmentation is not performed. Accordingly, it is difficult to ascertain whether a UE is receiving message segments in a conforming manner because there is no reliable segmentation outcome that is suitable for a test case.

As a result, a UE may receive and process message segments in a non-conforming manner. Accordingly, the UE may be unable to apply a configuration provided by a base station. Moreover, the UE and the base station may expend computing resources in connection with transmitting or receiving message segments that are not properly processed by the UE. In addition, if the UE cannot successfully apply a configuration provided by the base station, the base station may repeatedly transmit and/or the UE may repeatedly receive, configuration information, which consumes significant network resources.

Some techniques and apparatuses described herein facilitate conformance testing of segments of UE capability information. In some aspects, a base station (e.g., a test system) may transmit a test command to a UE that indicates a preconstructed UE capability information message that the UE is to use. The test command may be a non-access stratum (NAS) over-the-air message. The preconstructed message may be designed to have a size that satisfies a threshold size for message segmentation (e.g., the size exceeds a maximum PDCP SDU size). In some aspects, the base station may transmit a UE capability enquiry message indicating that message segmentation is permissible. In response, the UE may generate the UE capability information message using the preconstructed message (e.g., which exceeds a size for message segmentation), and the UE may transmit multiple segments of the UE capability information message.

Some techniques and apparatuses described herein facilitate conformance testing of downlink segmentation. In some aspects, a base station (e.g., a test system) may transmit a test command (e.g., a NAS over-the-air message) to a UE that indicates that the UE is to process the segments of a subsequent downlink message, and that the UE is to refrain from applying a configuration indicated by the downlink message. Accordingly, if processing of the segments is successful at the UE, the UE may transmit an acknowledgment message (e.g., an RRC reconfiguration complete message, an RRC resume complete message, or the like).

Accordingly, the base station may ascertain whether the segments of the UE capability information message are in conformance with applicable requirements, thereby reducing the prevalence of non-conforming segment messages. In this way, computing resources used to process non-conforming segment messages may be conserved and network resources consumed by repeated transmission of non-conforming segment messages may be conserved. Moreover, the base station may ascertain whether downlink message segment processing of the UE is in conformance with applicable requirements, thereby reducing the prevalence of non-conforming downlink message segment processing. In this way, computing resources used as a result of improper processing of downlink segment messages may be conserved and network resources consumed by repeated transmission of configuration information for the UE may be conserved.

Figure 4A:
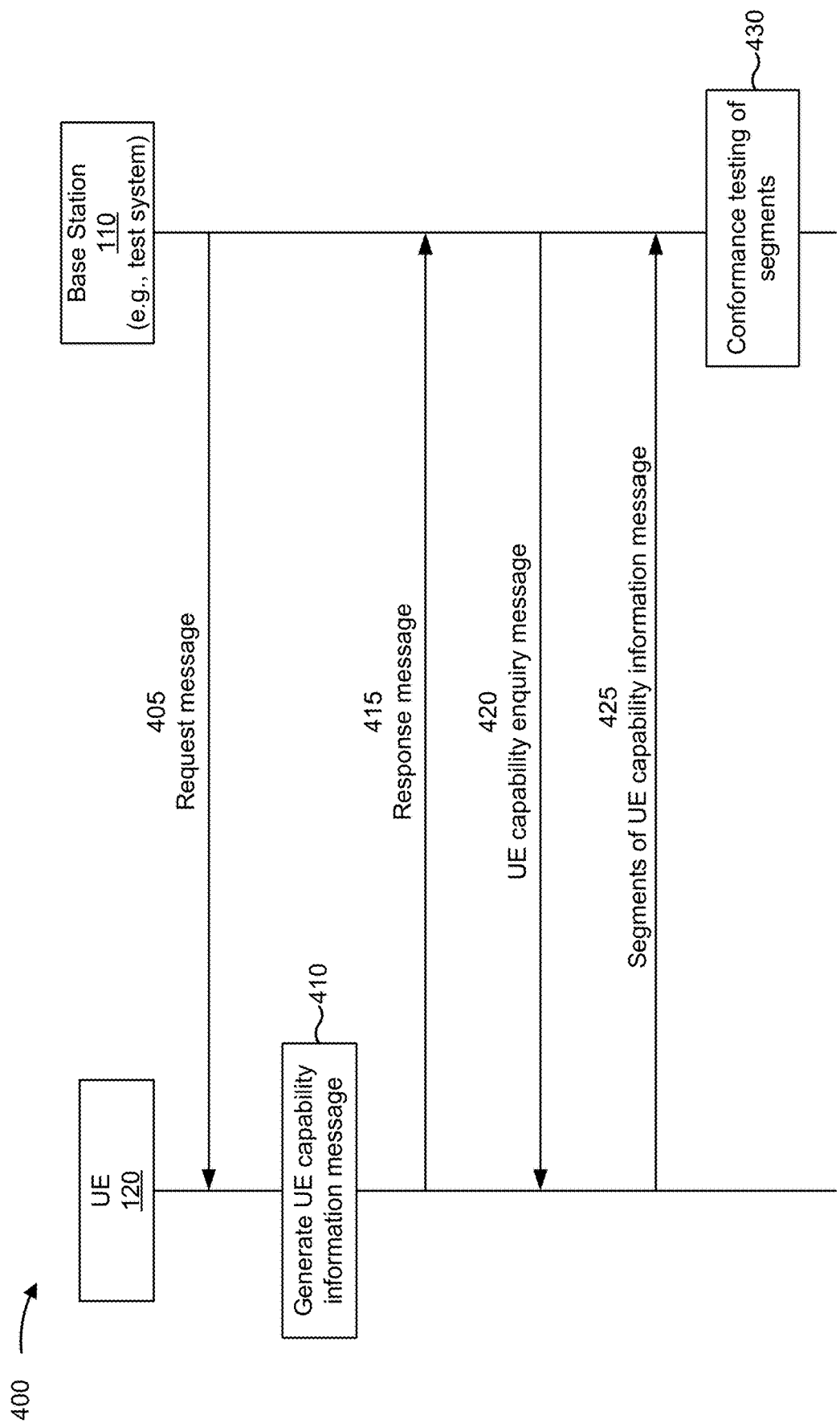
FIG. 4A is a diagram illustrating an example associated with conformance testing of uplink segmentation, in accordance with the present disclosure.

FIG. 4A is a diagram illustrating an example 400 associated with conformance testing of uplink segmentation, in accordance with the present disclosure. As shown in FIG. 4A, example 400 includes communication between a base station 110 and a UE 120. In some aspects, the base station 110 may be, or may implement, a conformance testing system. The UE 120 and the base station 110 may communicate via a wireless connection (e.g., that simulates an access link between the UE 120 and an ordinary base station 110 that is not used for testing). The base station 110 may perform conformance testing of the UE 120 via the wireless connection. In some aspects, the techniques and apparatuses described herein may apply to communication between the UE 120 and another UE 120 that is, or is implementing, a conformance testing system (e.g., that simulates a sidelink between the UE 120 and the other UE 120).

As shown by reference number 405, the base station 110 may transmit, and the UE 120 may receive, a request message indicating that the UE 120 is to include particular content in a UE capability information message (e.g., the UE 120 is to set the particular content for UE capability information). Thus, the request message may be referred to as a "set UE capability info request." The request message may be an over-the-air (OTA) message. For example, the request message may be a NAS test message (e.g., a NAS test command). The NAS test message may be a secure (e.g., ciphered) NAS test message.

In some aspects, the request message may include (e.g., in a payload of the request message) the particular content that the UE 120 is to include in a UE capability information message. In some aspects, the request message may identify (e.g., include a reference to) the particular content that the UE 120 is to include in a UE capability information message. For example, the UE 120 may store (e.g., in a storage of the UE 120) one or more content options for a UE capability information message, and the request message may identify one of the stored content options for inclusion in a UE capability information message.

In some aspects, the particular content may have a size that satisfies (e.g., exceeds) a threshold size for message segmentation. For example, the threshold size for message segmentation may be a maximum size of a PDCP SDU (e.g., 9 kB). In some aspects, the particular content may indicate a set of capabilities (e.g., RRC capabilities) that are unrelated to a set of actual capabilities of the UE 120. For example, the particular content may be dummy content that is designed (e.g., predefined) to exceed the threshold size for message segmentation.

In some aspects, the request message may include an information element (e.g., a "message type" information element) that identifies the request message as a set UE capability info request. For example, the information element may include an octet of bits that is set to a particular value to identify the request message. In some aspects, the request message may include an information element (e.g., a "use preconfigured UE capability" information element) that indicates (e.g., using a single bit) whether the UE 120 is to use the particular content in a UE capability information message. In some aspects, this information element may be used to identify the particular content, as described above.

In some aspects, the request message may indicate that the UE 120 is to provide UE capability information to an RRC subsystem of the UE 120 for relaying to one or more lower layers (e.g., a PDCP layer, an RLC layer, a MAC layer, and/or a PHY layer). In some aspects, the UE 120 may enter a test mode based at least in part on receiving the request message. For example, the UE 120 may enter the test mode after processing the request message. In other words, the request message may cause the UE 120 to enter the test mode.

As shown by reference number 410, the UE 120 (e.g., using the RRC subsystem) may generate a UE capability information message (e.g., for an RRC layer) based at least in part on the request message. For example, the UE 120 may include the particular content indicated by the request message in the UE capability information message. In some aspects, the UE 120 may obtain (e.g., using the RRC subsystem) the particular content for the UE capability information message from the request message or from a storage of the UE 120, as described above. Thus, the UE 120 may provide the particular content that is obtained for processing by the RRC layer and lower layers of the UE 120.

As described above, the set of capabilities indicated by the particular content may be unrelated to a set of actual capabilities of the UE 120. Thus, when generating the UE capability information message, the UE 120 may ignore (e.g., not indicate) the set of actual capabilities (e.g., RRC capabilities) of the UE 120. In some aspects, the UE 120 may generate the UE capability information message so that the message is ready for transmission upon receipt of a UE capability enquiry message. In some aspects, the UE 120 may generate the UE capability information upon receiving the UE capability enquiry message.

In some aspects, the UE 120 may generate the UE capability information message, in accordance with the request message, if (e.g., based at least in part on a determination that) the UE 120 is operating (e.g., currently operating) in an RRC connected state. In some aspects, the UE 120 may generate the UE capability information message, in accordance with the request message, based at least in part on a determination that the request message indicated (e.g., the "use preconfigured UE capability" information element indicated) that the UE 120 is to use the particular content in the UE capability information message.

As shown by reference number 415, the UE 120 may transmit, and the base station 110 may receive, a response message indicating receipt of the request message. Thus, the response message may be referred to as a "set UE capability info response." In some aspects, the response message may provide confirmation that the UE 120 is generating a UE capability information message in accordance with the particular content indicated by the request message (e.g., provide confirmation that the UE is setting the UE capability information to the particular content). In some aspects, the UE 120 may transmit the response message if (e.g., based at least in part on a determination that) the UE 120 is operating (e.g., currently operating) in an RRC connected state.

The response message may be an OTA message. For example, the response message may be a NAS message, as described above. In some aspects, the response message may include an information element (e.g., a "message type" information element) that identifies the response message as a set UE capability info response. For example, the information element may include an octet of bits that is set to a particular value to identify the response message.

As shown by reference number 420, the base station 110 may transmit, and the UE 120 may receive, a UE capability enquiry message. The UE capability enquiry message may indicate that the base station 110 is requesting UE capability information from the UE 120. In some aspects, the UE capability enquiry message may indicate that message segmentation is permitted (e.g., an rrc-segAllowed-r16 information element of the UE capability enquiry message may provide an indication that message segmentation is permitted). In some aspects, the UE capability enquiry message is an RRC message (e.g., the base station 110 may transmit the UE capability enquiry message via RRC signaling).

As shown by reference number 425, the UE 120 may transmit one or more (e.g., multiple) segments of the UE capability information message generated by the UE 120. The UE 120 may transmit multiple segments of the UE capability information message based at least in part on the UE capability enquiry message indicating that message segmentation is permitted. If segmentation is not permitted, the UE 120 may transmit only a first segment of the UE capability information message.

In some aspects, when transmitting the one or more segments, the UE 120 may perform (e.g., using the RRC subsystem) segmentation of the UE capability information message. For example, the UE 120 may perform segmentation of the UE capability information message based at least in part on a determination that a size of the message exceeds the threshold size for message segmentation (e.g., 9 kB). As described herein, the UE capability information message will exceed the threshold size because the message includes the particular content that is preconstructed to exceed the threshold size.

In some aspects, the UE 120 may transmit each segment of the UE capability information message in a respective dedicated message-segment message (e.g., in an rrc-MessageSegmentContainer of an ULDedicatedMessageSegment message). The quantity of segments transmitted by the UE 120 may be known in advance by the base station 110 (e.g., based at least in part on a size of the particular content used for the UE capability information message). Moreover, a content of each segment of the UE capability information message may be known in advance by the base station 110 (e.g., a content of each segment is predefined according to the particular content used for the UE capability information message).

As shown by reference number 430, the base station 110 may perform conformance testing of the segments of the UE capability information message. That is, the base station 110 may determine whether the segments of the UE capability information message conform with a standard (e.g., according to a 3GPP technical specification) or another applicable requirement. For example, the base station may process (e.g., analyze) the segments of the UE capability information message in order to determine whether the quantity of segments corresponds to an anticipated quantity of segments and/or whether the segments are formatted properly, contain one or more specified values, contain the correct contents, or the like.

Conformance testing of the segments of the UE capability information message is facilitated by setting the contents of the message so as to trigger segmentation of the message. In this way, the prevalence of non-conforming segment messages may be reduced. Accordingly, the techniques and apparatuses described herein conserve network resources and/or computing resources that may otherwise be used processing non-conforming segment messages.

In some implementations, the procedure described above for example 400 may be used in connection with an uplink message other than a UE capability information message. For example, the uplink message may be capable of having a size that satisfies (e.g., exceeds) the threshold size for message segmentation.

As indicated above, FIG. 4A is provided as an example. Other examples may differ from what is described with respect to FIG. 4A.

Figure 4B:
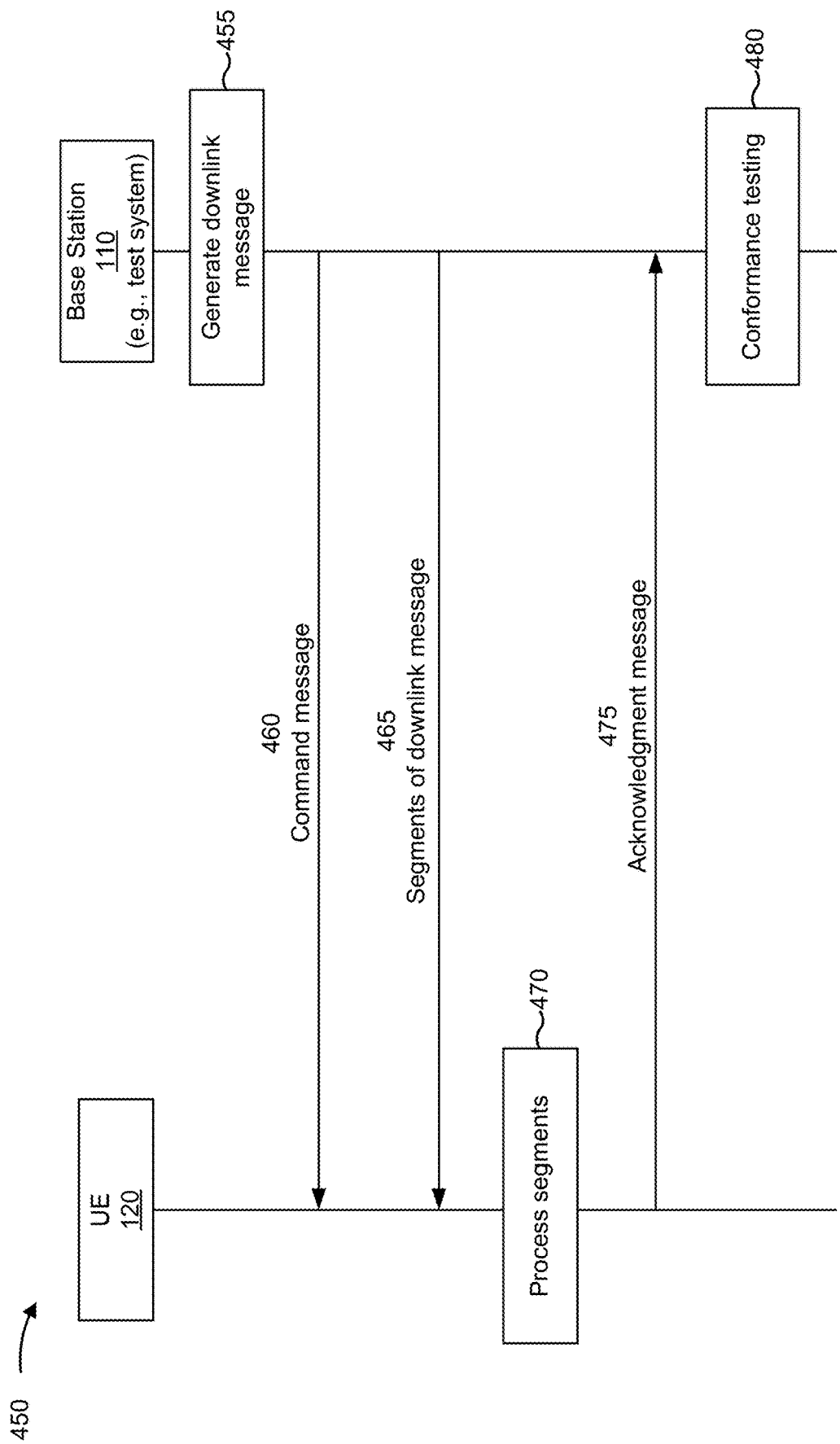
FIG. 4B is a diagram illustrating an example associated with conformance testing of downlink segmentation, in accordance with the present disclosure.

FIG. 4B is a diagram illustrating an example 450 associated with conformance testing of downlink segmentation, in accordance with the present disclosure. As shown in FIG. 4B, example 450 includes communication between a base station 110 and a UE 120. In some aspects, the base station 110 may be, or may implement, a conformance testing system. The UE 120 and the base station 110 may communicate via a wireless connection (e.g., that simulates an access link between the UE 120 and an ordinary base station 110 that is not used for testing). The base station 110 may perform conformance testing of the UE 120 via the wireless connection. In some aspects, the techniques and apparatuses described herein may apply to communication between the UE 120 and another UE 120 that is, or is implementing, a conformance testing system (e.g., that simulates a sidelink between the UE 120 and the other UE 120).

As shown by reference number 455, the base station 110 may generate a downlink message. The downlink message may be an RRC message, such as an RRC reconfiguration message, an RRC resume message, or the like. In some aspects, the downlink message may be a dummy message. For example, the downlink message may include dummy content (e.g., a dummy RRC configuration that is unrelated to an actual configuration for the UE 120) that is designed to exceed the threshold size for message segmentation (e.g., 9 kB). Although the downlink message may include dummy content, the base station 110 may generate the downlink message using valid formatting (e.g., the downlink message may be abstract syntax notation 1 (ASN.1) valid).

As shown by reference number 460, the base station 110 may transmit, and the UE 120 may receive, a command message indicating that testing of downlink segmentation is to be performed. Thus, the command message may be referred to as a "Test DL Segmentation message." The command message may indicate to the UE 120 that a subsequent downlink message received by the UE 120 (e.g., the downlink message generated by the base station 110) is to be processed only at an RRC layer of the UE 120 (e.g., the UE 120 is to ignore configuring lower layers of the UE 120 in accordance with a configuration indicated by the downlink message).

The command message may be an OTA message. For example, the command message may be a NAS test message (e.g., a NAS test command), as described above. In some aspects, the UE 120 may enter a test mode based at least in part on receiving the command message, in a similar manner as described above.

As shown by reference number 465, the base station 110 may transmit, and the UE 120 may receive, one or more (e.g., multiple) segments of the downlink message generated by the base station 110. For example, the base station 110 may transmit each segment of the downlink message in a respective dedicated message-segment message (e.g., in an rrc-MessageSegmentContainer of a DLDedicatedMessageSegment message).

As shown by reference number 470, the UE 120 may process the segments of the downlink message (e.g., the UE 120 may process the downlink message). For example, the UE 120 may process the segments of the downlink message to obtain the downlink message (e.g., to obtain the entire dummy content of the downlink message). In some aspects, the UE 120 may process the downlink message if the UE 120 is operating (e.g., currently operating) in an RRC connected state.

In some aspects, the UE 120 may process (e.g., in the test mode) the downlink message only at an RRC layer of the UE. Additionally, or alternatively, the UE 120 may process (e.g., in the test mode) the downlink message only for validating a formatting of the downlink message (e.g., for an ASN.1 check). Accordingly, the UE 120 (e.g., in the test mode) may ignore and/or may discard a configuration indicated by the downlink message (e.g., the UE 120 may refrain from applying the configuration). That is, the UE 120 may refrain from configuring lower layers of the UE 120 in accordance with the configuration (e.g., received in an RRC reconfiguration message, an RRC resume message, or the like).

As shown by reference number 475, the UE 120 may transmit, and the base station 110 may receive, an acknowledgment message (e.g., that indicates successful processing of the segments by the UE 120). The acknowledgment message may be an RRC reconfiguration complete message, an RRC resume complete message, or the like. The UE 120 may transmit the acknowledgment message if the UE 120 successfully processed the segments of the downlink message (e.g., if the UE 120 obtained the downlink message from processing the segments and/or if the UE 120 validated the formatting of the downlink message). Otherwise, the UE 120 may transmit a connection re-establishment message to the base station 110.

In some aspects (e.g., after transmitting the acknowledgment message), the UE 120 may return to a previous stable state of the UE 120 (e.g., before entering the test mode). In some aspects, the base station 110 may transmit, and the UE 120 may receive, a command message indicating that the UE 120 is to deactivate the test mode.

As shown by reference number 480, the base station 110 may perform conformance testing of downlink segmentation at the UE 120. For example, if the base station 110 receives the acknowledgment message from the UE 120, the base station 110 may determine that downlink segment processing at the UE 120 is in conformance with applicable requirements. The conformance testing is facilitated by setting the contents of the downlink message so as to trigger segmentation of the message. In this way, the prevalence of non-conforming processing of downlink segment messages may be reduced.

As indicated above, FIG. 4B is provided as an example. Other examples may differ from what is described with respect to FIG. 4B.

Figure 5:
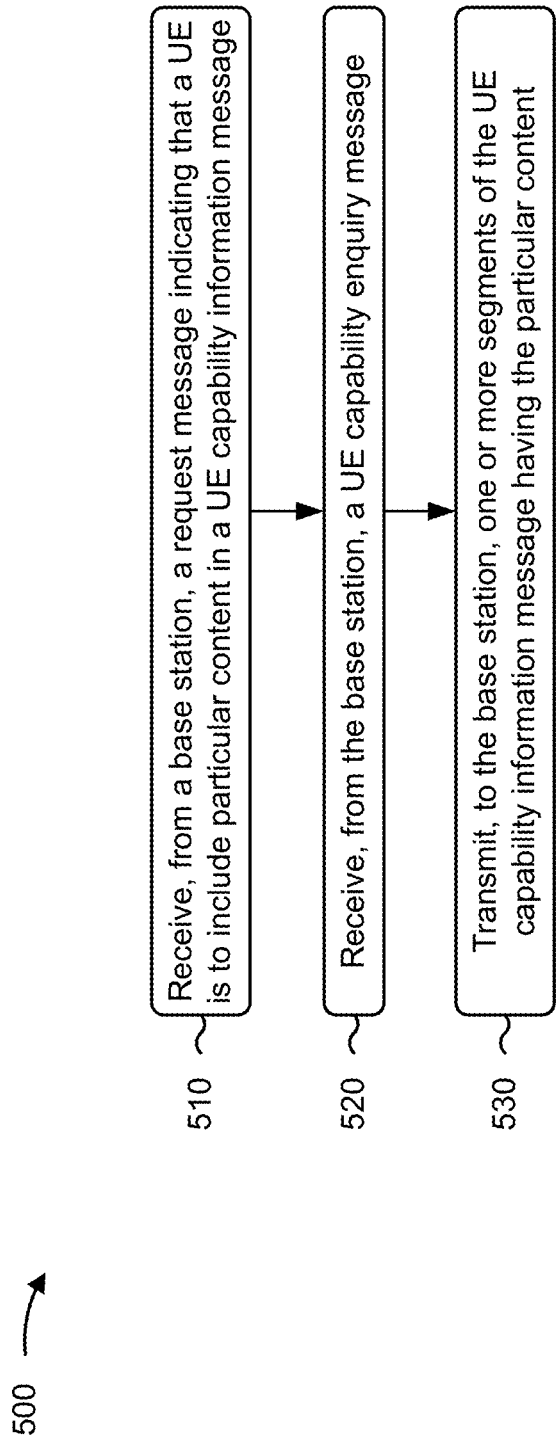
FIGS. 5-6 are diagrams illustrating example processes associated with conformance testing of uplink segmentation, in accordance with the present disclosure.

FIG. 5 is a diagram illustrating an example process 500 performed, for example, by a UE, in accordance with the present disclosure. Example process 500 is an example where the UE (e.g., UE 120) performs operations associated with conformance testing of uplink segmentation.

As shown in FIG. 5, in some aspects, process 500 may include receiving, from a base station, a request message indicating that a UE is to include particular content in a UE capability information message (block 510). For example, the UE (e.g., using reception component 702, depicted in FIG. 7) may receive, from a base station, a request message indicating that the UE is to include particular content in a UE capability information message, as described above.

As further shown in FIG. 5, in some aspects, process 500 may include receiving, from the base station, a UE capability enquiry message (block 520). For example, the UE (e.g., using reception component 702, depicted in FIG. 7) may receive, from the base station, a UE capability enquiry message, as described above.

As further shown in FIG. 5, in some aspects, process 500 may include transmitting, to the base station, one or more segments of the UE capability information message having the particular content (block 530). For example, the UE (e.g., using transmission component 704, depicted in FIG. 7) may transmit, to the base station, one or more segments of the UE capability information message having the particular content, as described above.

Process 500 may include additional aspects, such as any single aspect or any combination of aspects described below and/or in connection with one or more other processes described elsewhere herein.

In a first aspect, process 500 includes transmitting a response message providing confirmation that the UE is to include the particular content in the UE capability information message.

In a second aspect, alone or in combination with the first aspect, process 500 includes entering a test mode based at least in part on receiving the request message.

In a third aspect, alone or in combination with one or more of the first and second aspects, process 500 includes obtaining the particular content from the request message or from a storage of the UE.

In a fourth aspect, alone or in combination with one or more of the first through third aspects, process 500 includes generating the UE capability information message with the particular content.

In a fifth aspect, alone or in combination with one or more of the first through fourth aspects, the particular content indicates a set of capabilities that are unrelated to a set of actual capabilities of the UE.

In a sixth aspect, alone or in combination with one or more of the first through fifth aspects, a size of the particular content satisfies a threshold size for message segmentation.

In a seventh aspect, alone or in combination with one or more of the first through sixth aspects, the one or more segments of the UE capability information message are transmitted based at least in part on the UE capability enquiry message indicating that message segmentation is permitted.

In an eighth aspect, alone or in combination with one or more of the first through seventh aspects, the one or more segments are transmitted in respective dedicated message-segment messages.

In a ninth aspect, alone or in combination with one or more of the first through eighth aspects, the request message is a NAS test message.

In a tenth aspect, alone or in combination with one or more of the first through ninth aspects, the NAS test message is an over-the-air message.

In an eleventh aspect, alone or in combination with one or more of the first through tenth aspects, the UE capability information message is an RRC message.

In a twelfth aspect, alone or in combination with one or more of the first through eleventh aspects, the one or more segments of the UE capability information message are transmitted based at least in part on a determination that the UE is operating in an RRC connected state.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
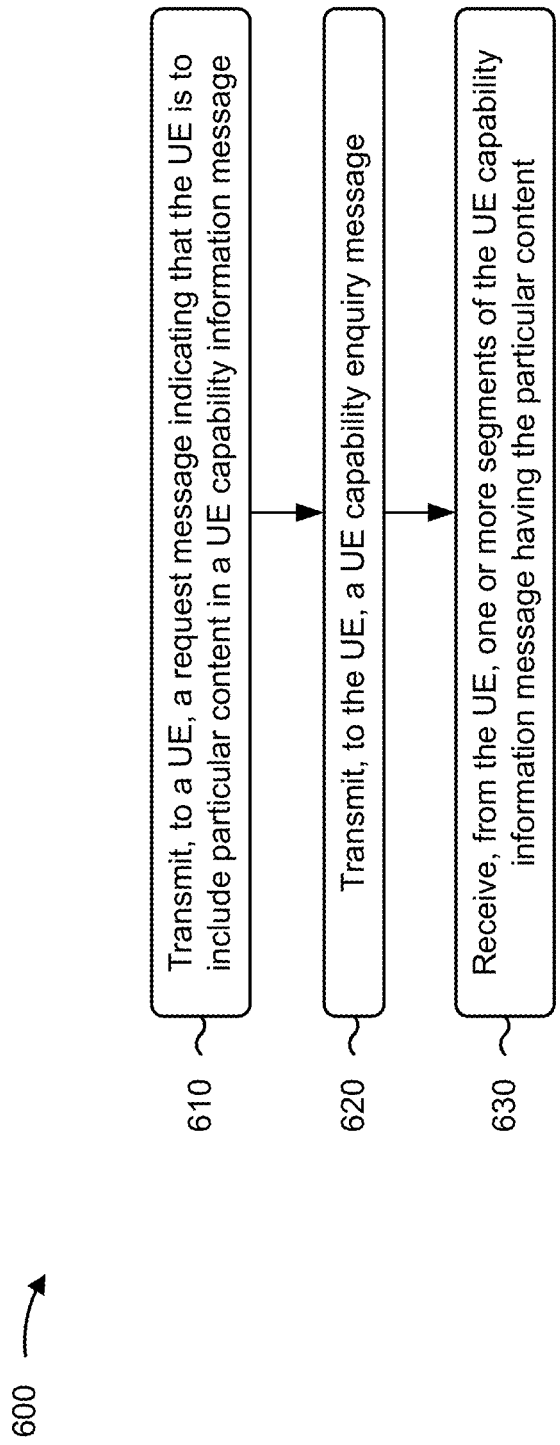

FIG. 6 is a diagram illustrating an example process 600 performed, for example, by a base station, in accordance with the present disclosure. Example process 600 is an example where the base station (e.g., base station 110) performs operations associated with conformance testing of uplink segmentation.

As shown in FIG. 6, in some aspects, process 600 may include transmitting, to a UE, a request message indicating that the UE is to include particular content in a UE capability information message (block 610). For example, the base station (e.g., using transmission component 804, depicted in FIG. 8) may transmit, to a UE, a request message indicating that the UE is to include particular content in a UE capability information message, as described above.

As further shown in FIG. 6, in some aspects, process 600 may include transmitting, to the UE, a UE capability enquiry message (block 620). For example, the base station (e.g., using transmission component 804, depicted in FIG. 8) may transmit, to the UE, a UE capability enquiry message, as described above.

As further shown in FIG. 6, in some aspects, process 600 may include receiving, from the UE, one or more segments of the UE capability information message having the particular content (block 630). For example, the base station (e.g., using reception component 802, depicted in FIG. 8) may receive, from the UE, one or more segments of the UE capability information message having the particular content, as described above.

Process 600 may include additional aspects, such as any single aspect or any combination of aspects described below and/or in connection with one or more other processes described elsewhere herein.

In a first aspect, process 600 includes receiving a response message providing confirmation that the UE is to include the particular content in the UE capability information message.

In a second aspect, alone or in combination with the first aspect, process 600 includes determining whether the one or more segments of the UE capability information message are in conformance with a standard.

In a third aspect, alone or in combination with one or more of the first and second aspects, the particular content indicates a set of capabilities that are unrelated to a set of actual capabilities of the UE.

In a fourth aspect, alone or in combination with one or more of the first through third aspects, a size of the particular content satisfies a threshold size for message segmentation.

In a fifth aspect, alone or in combination with one or more of the first through fourth aspects, the one or more segments of the UE capability information message are received based at least in part on the UE capability enquiry message indicating that message segmentation is permitted.

In a sixth aspect, alone or in combination with one or more of the first through fifth aspects, the one or more segments are received in respective dedicated message-segment messages.

In a seventh aspect, alone or in combination with one or more of the first through sixth aspects, the request message is a NAS test message.

In an eighth aspect, alone or in combination with one or more of the first through seventh aspects, the NAS test message is an over-the-air message.

In a ninth aspect, alone or in combination with one or more of the first through eighth aspects, the UE capability information message is an RRC message.

In a tenth aspect, alone or in combination with one or more of the first through ninth aspects, the one or more segments of the UE capability information message are received based at least in part on the UE operating in an RRC connected state.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
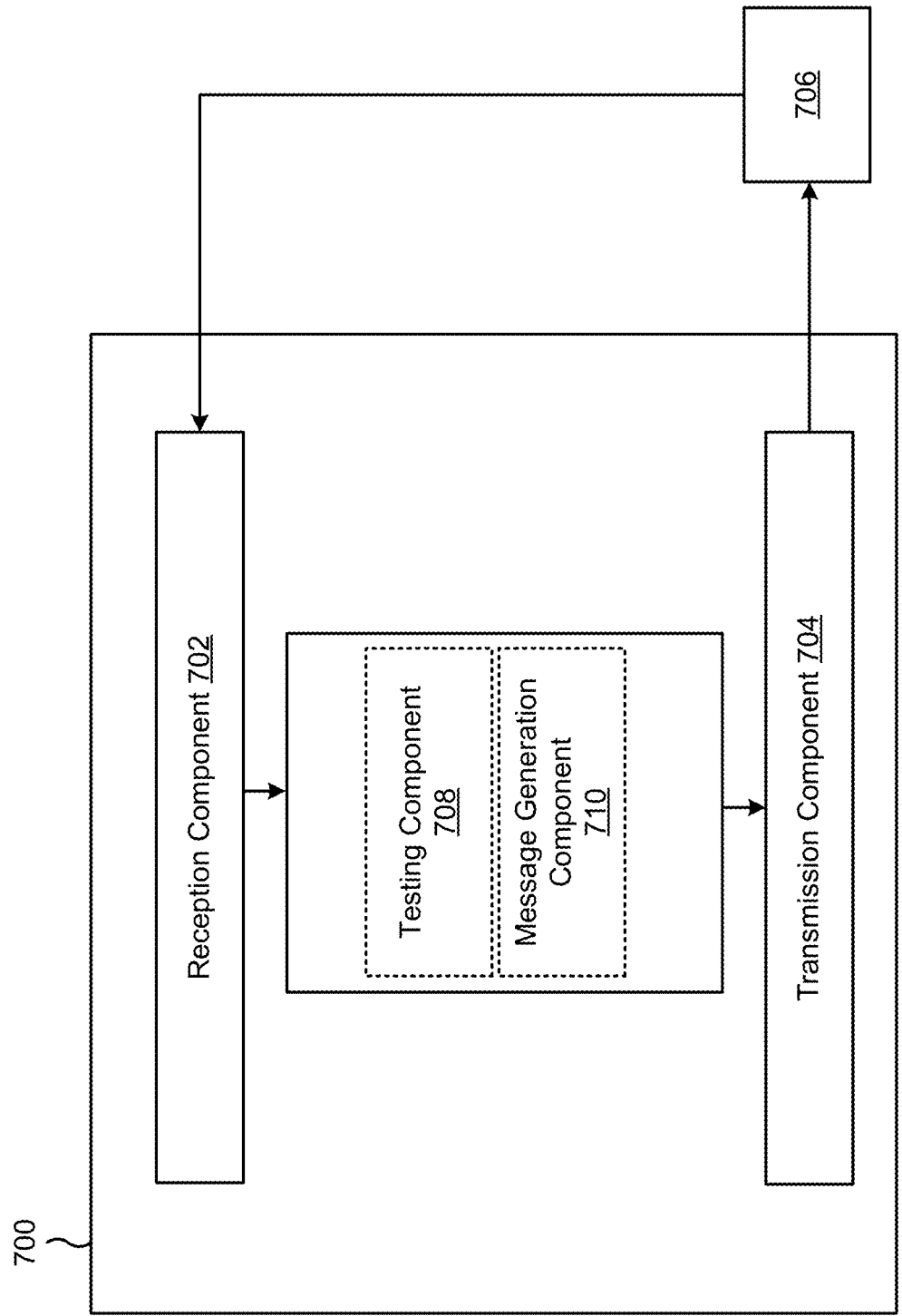
FIGS. 7-8 are diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a testing component 708 or a message generation component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, from a base station, a request message indicating that the apparatus 700 is to include particular content in a UE capability information message. The reception component 702 may receive, from the base station, a UE capability enquiry message. The transmission component 704 may transmit, to the base station, one or more segments of the UE capability information message having the particular content. The transmission component 704 may transmit a response message providing confirmation that the apparatus 700 is to include the particular content in the UE capability information message.

The testing component 708 may enter a test mode based at least in part on receiving the request message. The message generation component 710 may obtain the particular content from the request message or from a storage of the UE. The message generation component 710 may generate the UE capability information message with the particular content.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
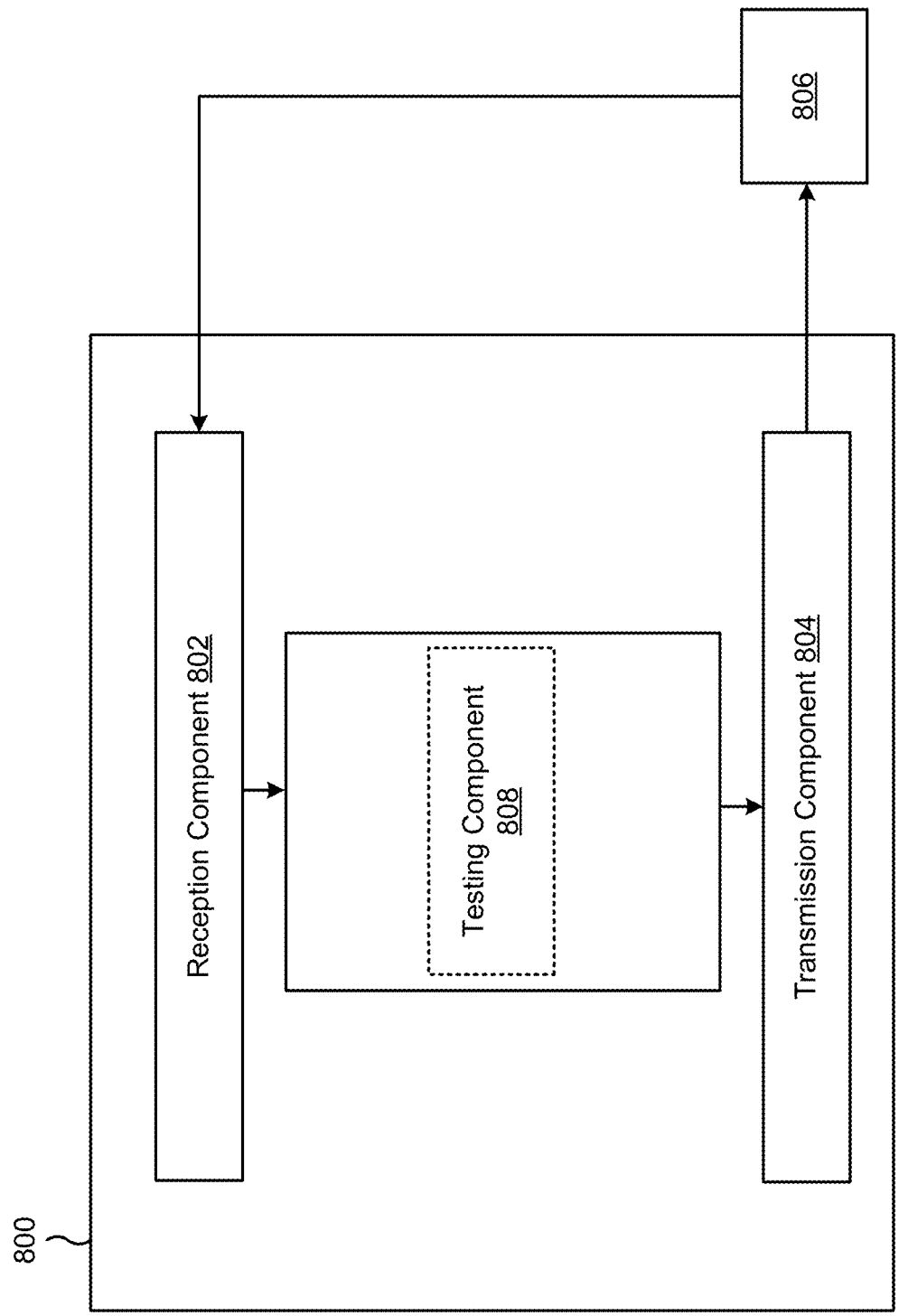

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a testing component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, a request message indicating that the UE is to include particular content in a UE capability information message. The transmission component 804 may transmit, to the UE, a UE capability enquiry message. The reception component 802 may receive, from the UE, one or more segments of the UE capability information message having the particular content. The reception component 802 may receive a response message providing confirmation that the UE is to include the particular content in the UE capability information message. The testing component 808 may determine whether the one or more segments of the UE capability information message are in conformance with a standard.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a base station, a request message indicating that the UE is to include particular content in a UE capability information message; receiving, from the base station, a UE capability enquiry message; and transmitting, to the base station, one or more segments of the UE capability information message having the particular content.

Aspect 2: The method of Aspect 1, further comprising: transmitting a response message providing confirmation that the UE is to include the particular content in the UE capability information message.

Aspect 3: The method of any of Aspects 1-2, further comprising: entering a test mode based at least in part on receiving the request message.

Aspect 4: The method of any of Aspects 1-3, further comprising: obtaining the particular content from the request message or from a storage of the UE.

Aspect 5: The method of any of Aspects 1-4, further comprising: generating the UE capability information message with the particular content.

Aspect 6: The method of any of Aspects 1-5, wherein the particular content indicates a set of capabilities that are unrelated to a set of actual capabilities of the UE.

Aspect 7: The method of any of Aspects 1-6, wherein a size of the particular content satisfies a threshold size for message segmentation.

Aspect 8: The method of any of Aspects 1-7, wherein the one or more segments of the UE capability information message are transmitted based at least in part on the UE capability enquiry message indicating that message segmentation is permitted.

Aspect 9: The method of any of Aspects 1-8, wherein the one or more segments are transmitted in respective dedicated message-segment messages.

Aspect 10: The method of any of Aspects 1-9, wherein the request message is a non-access stratum (NAS) test message.

Aspect 11: The method of Aspect 10, wherein the NAS test message is an over-the-air message.

Aspect 12: The method of any of Aspects 1-11, wherein the UE capability information message is a radio resource control message.

Aspect 13: The method of any of Aspects 1-12, wherein the one or more segments of the UE capability information message are transmitted based at least in part on a determination that the UE is operating in a radio resource control (RRC) connected state.

Aspect 14: A method of wireless communication performed by a base station, comprising: transmitting, to a user equipment (UE), a request message indicating that the UE is to include particular content in a UE capability information message; transmitting, to the UE, a UE capability enquiry message; and receiving, from the UE, one or more segments of the UE capability information message having the particular content.

Aspect 15: The method of Aspect 14, further comprising: receiving a response message providing confirmation that the UE is to include the particular content in the UE capability information message.

Aspect 16: The method of any of Aspects 14-15, further comprising: determining whether the one or more segments of the UE capability information message are in conformance with a standard.

Aspect 17: The method of any of Aspects 14-16, wherein the particular content indicates a set of capabilities that are unrelated to a set of actual capabilities of the UE.

Aspect 18: The method of any of Aspects 14-17, wherein a size of the particular content satisfies a threshold size for message segmentation.

Aspect 19: The method of any of Aspects 14-18, wherein the one or more segments of the UE capability information message are received based at least in part on the UE capability enquiry message indicating that message segmentation is permitted.

Aspect 20: The method of any of Aspects 14-19, wherein the one or more segments are received in respective dedicated message-segment messages.

Aspect 21: The method of any of Aspects 14-20, wherein the request message is a non-access stratum (NAS) test message.

Aspect 22: The method of Aspect 21, wherein the NAS test message is an over-the-air message.

Aspect 23: The method of any of Aspects 14-22, wherein the UE capability information message is a radio resource control message.

Aspect 24: The method of any of Aspects 14-23, wherein the one or more segments of the UE capability information message are received based at least in part on the UE operating in a radio resource control (RRC) connected state.

Aspect 25: An apparatus for wireless communication at a device, comprising a processor; memory coupled with the processor; and instructions stored in the memory and executable by the processor to cause the apparatus to perform the method of one or more Aspects of Aspects 1-13.

Aspect 26: A device for wireless communication, comprising a memory and one or more processors coupled to the memory, the memory and the one or more processors configured to perform the method of one or more Aspects of Aspects 1-13.

Aspect 27: An apparatus for wireless communication, comprising at least one means for performing the method of one or more Aspects of Aspects 1-13.

Aspect 28: A non-transitory computer-readable medium storing code for wireless communication, the code comprising instructions executable by a processor to perform the method of one or more Aspects of Aspects 1-13.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 30: An apparatus for wireless communication at a device, comprising a processor; memory coupled with the processor; and instructions stored in the memory and executable by the processor to cause the apparatus to perform the method of one or more Aspects of Aspects 14-24.

Aspect 31: A device for wireless communication, comprising a memory and one or more processors coupled to the memory, the memory and the one or more processors configured to perform the method of one or more Aspects of Aspects 14-24.

Aspect 32: An apparatus for wireless communication, comprising at least one means for performing the method of one or more Aspects of Aspects 14-24.

Aspect 33: A non-transitory computer-readable medium storing code for wireless communication, the code comprising instructions executable by a processor to perform the method of one or more Aspects of Aspects 14-24.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 14-24.

Aspect 35: A method of wireless communication performed by a user equipment (UE), comprising: receiving, from a base station, a command message indicating that testing of downlink segmentation is to be performed; receiving, from the base station, one or more segments of a downlink message that includes content that is designed to exceed a threshold size for message segmentation; and transmitting, to the base station, an acknowledgment message indicating successful processing of the one or more segments of the downlink message.

Aspect 36: The method of Aspect 35, further comprising: processing the one or more segments of the downlink message without applying a configuration indicated by the content of the downlink message.

Aspect 37: The method of any of Aspects 35-36, further comprising: entering a test mode based at least in part on receiving the command message.

Aspect 38: The method of any of Aspects 35-37, wherein the acknowledgment message is a radio resource control (RRC) reconfiguration complete message or an RRC resume complete message.

Aspect 39: The method of any of Aspects 35-38, wherein the downlink message is a radio resource control (RRC) reconfiguration message or an RRC resume message.

Aspect 40: A method of wireless communication performed by a base station, comprising: transmitting, to a user equipment (UE), a command message indicating that testing of downlink segmentation is to be performed; transmitting, to the UE, one or more segments of a downlink message that includes content that is designed to exceed a threshold size for message segmentation; and receiving, from the UE, an acknowledgment message indicating successful processing of the one or more segments of the downlink message.

Aspect 41: The method of Aspect 40, further comprising: determining that downlink segment processing of the UE conforms to a standard based at least in part on receiving the acknowledgment message.

Aspect 42: The method of any of Aspects 40-41, wherein the command message is to cause the UE to enter a test mode.

Aspect 43: The method of any of Aspects 40-42, wherein the acknowledgment message is a radio resource control (RRC) reconfiguration complete message or an RRC resume complete message.

Aspect 44: The method of any of Aspects 40-43, wherein the downlink message is a radio resource control (RRC) reconfiguration message or an RRC resume message.

Aspect 45: An apparatus for wireless communication at a device, comprising a processor; memory coupled with the processor; and instructions stored in the memory and executable by the processor to cause the apparatus to perform the method of one or more Aspects of Aspects 35-39.

Aspect 46: A device for wireless communication, comprising a memory and one or more processors coupled to the memory, the memory and the one or more processors configured to perform the method of one or more Aspects of Aspects 35-39.

Aspect 47: An apparatus for wireless communication, comprising at least one means for performing the method of one or more Aspects of Aspects 35-39.

Aspect 48: A non-transitory computer-readable medium storing code for wireless communication, the code comprising instructions executable by a processor to perform the method of one or more Aspects of Aspects 35-39.

Aspect 49: A non-transitory computer-readable medium storing a set of instructions for wireless communication, the set of instructions comprising one or more instructions that, when executed by one or more processors of a device, cause the device to perform the method of one or more Aspects of Aspects 35-39.

Aspect 50: An apparatus for wireless communication at a device, comprising a processor; memory coupled with the processor; and instructions stored in the memory and executable by the processor to cause the apparatus to perform the method of one or more Aspects of Aspects 40-44.

Aspect 51: A device for wireless communication, comprising a memory and one or more processors coupled to the memory, the memory and the one or more processors configured to perform the method of one or more Aspects of Aspects 40-44.

Aspect 52: An apparatus for wireless communication, comprising at least one means for performing the method of one or more Aspects of Aspects 40-44.

Aspect 53: A non-transitory computer-readable medium storing code for wireless communication, the code comprising instructions executable by a processor to perform the method of one or more Aspects of Aspects 40-44.

Aspect 54: A non-transitory computer-readable medium storing a set of instructions for wireless communication, the set of instructions comprising one or more instructions that, when executed by one or more processors of a device, cause the device to perform the method of one or more Aspects of Aspects 40-44.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors coupled to the one or more memories, wherein the one or more processors cause the UE to:
        receive, from a base station, a request message indicating that the UE is to set particular content for UE capability information, wherein the particular content is predefined to satisfy a threshold size for message segmentation,
        wherein the request message causes the UE to enter a test mode in association with conformance testing of the message segmentation;
        receive, from the base station and in association with the conformance testing, a UE capability enquiry message; and
        transmit, to the base station, one or more segments of a UE capability information message having the particular content in association with the conformance testing.

2. The UE of claim 1, wherein the one or more processors further cause the UE to:
    transmit a response message providing confirmation that the UE is setting the particular content for the UE capability information.

3. The UE of claim 1, wherein the one or more processors further cause the UE to:
    obtain the particular content from the request message or from a storage of the UE.

4. The UE of claim 1, wherein the one or more processors further cause the UE to:
    generate the UE capability information message with the particular content.

5. The UE of claim 1, wherein the particular content indicates a set of capabilities that are unrelated to a set of actual capabilities of the UE.

6. The UE of claim 1, wherein the one or more segments of the UE capability information message are transmitted based at least in part on the UE capability enquiry message indicating that the message segmentation is permitted.

7. The UE of claim 1, wherein the one or more segments are transmitted in respective dedicated message-segment messages.

8. The UE of claim 1, wherein the request message is a non-access stratum (NAS) test message, and
    wherein the NAS test message is an over-the-air message.

9. The UE of claim 1, wherein the UE capability information message is a radio resource control message.

10. The UE of claim 1, wherein the one or more segments of the UE capability information message are transmitted if the UE is operating in a radio resource control (RRC) connected state.

11. A base station for wireless communication, comprising:
    one or more memories; and
    one or more processors coupled to the one or more memories, wherein the one or more processors cause the base station to:
        transmit, to a user equipment (UE), a request message indicating that the UE is to set particular content for UE capability information, wherein the particular content is predefined to satisfy a threshold size for message segmentation, wherein the request message causes the UE to enter a test mode in association with conformance testing of the message segmentation;

transmit, to the UE and in association with the conformance testing, a UE capability enquiry message; and receive, from the UE, one or more segments of a UE capability information message having the particular content in association with the conformance testing.

12. The base station of claim 11, wherein the one or more processors further cause the base station to:

receive a response message providing confirmation that the UE is setting the particular content for the UE capability information.

13. The base station of claim 11, wherein the one or more processors further cause the base station to:

determine whether the one or more segments of the UE capability information message are in conformance with a standard.

14. The base station of claim 11, wherein the particular content indicates a set of capabilities that are unrelated to a set of actual capabilities of the UE.

15. The base station of claim 11, wherein the one or more segments of the UE capability information message are received based at least in part on the UE capability enquiry message indicating that the message segmentation is permitted.

16. The base station of claim 11, wherein the one or more segments are received in respective dedicated message-segment messages.

17. The base station of claim 11, wherein the request message is a non-access stratum (NAS) test message, and wherein the NAS test message is an over-the-air message.

18. The base station of claim 11, wherein the UE capability information message is a radio resource control message.

19. The base station of claim 11, wherein the one or more segments of the UE capability information message are received based at least in part on the UE operating in a radio resource control (RRC) connected state.

20. A method of wireless communication performed by a user equipment (UE) for conformance testing of message segmentation, comprising:

receiving, from a base station, a request message indicating that the UE is to set particular content for UE capability information, wherein the particular content is predefined to satisfy a threshold size for the message segmentation, wherein the request message causes the UE to enter a test mode in association with conformance testing of the message segmentation;

receiving, from the base station and in association with the conformance testing, a UE capability enquiry message; and transmitting, to the base station, one or more segments of a UE capability information message having the particular content in association with the conformance testing.

21. The method of claim 20, further comprising:

transmitting a response message providing confirmation that the UE is setting the particular content for the UE capability information.

22. The method of claim 20, wherein the particular content indicates a set of capabilities that are unrelated to a set of actual capabilities of the UE.

23. A method of wireless communication performed by a base station for conformance testing of message segmentation, comprising:

transmitting, to a user equipment (UE), a request message indicating that the UE is to set particular content for UE capability information, wherein the particular content is predefined to satisfy a threshold size for the message segmentation, wherein the request message causes the UE to enter a test mode in association with conformance testing of the message segmentation;

transmitting, to the UE and in association with the conformance testing, a UE capability enquiry message; and receiving, from the UE, one or more segments of a UE capability information message having the particular content in association with the conformance testing.

24. The method of claim 23, further comprising:

receiving a response message providing confirmation that the UE is setting the particular content for the UE capability information.

25. The method of claim 23, wherein the particular content indicates a set of capabilities that are unrelated to a set of actual capabilities of the UE.

26. The method of claim 20, further comprising:

obtaining the particular content from the request message or from a storage of the UE.

27. The method of claim 20, further comprising:

generating the UE capability information message with the particular content.

28. The method of claim 20, wherein the one or more segments of the UE capability information message are transmitted based at least in part on the UE capability enquiry message indicating that the message segmentation is permitted.

29. The method of claim 20, wherein the one or more segments are transmitted in respective dedicated message-segment messages.

30. The method of claim 20, wherein the request message is a non-access stratum (NAS) test message, and wherein the NAS test message is an over-the-air message.

* * * * *